United States Patent [19]
Kemp

[11] 3,864,111
[45] Feb. 4, 1975

[54] REDUCING STRESS BIREFRINGENCE IN FUSED SILICA OPTICAL ELEMENTS
[76] Inventor: James C. Kemp, 1945 Kincaid St., Apt. 1, Eugene, Oreg. 97403
[22] Filed: Aug. 8, 1973
[21] Appl. No.: 386,645

[52] U.S. Cl. .................................. 65/31, 156/15
[51] Int. Cl. .................................... C03c 15/00
[58] Field of Search ...................... 65/31; 156/15

[56] References Cited
UNITED STATES PATENTS
1,981,815  11/1934  Stanley ......................... 65/31 X R Primary Examiner—Arthur D. Kellogg
Attorney, Agent, or Firm—James C. Wray

[57] ABSTRACT

Stress-birefringence in light transmitting fused-silica optical elements is reduced by the etch removal of surface layers stressed by mechanical abrasion and thermal effects in the fabrication of the optical elements. The etch is applied selectively to the non-light-transmitting surfaces of the optical element to relieve stress-birefringence inducing uniaxial strain directed in the plane of the light-transmitting faces.

11 Claims, 8 Drawing Figures

PATENTED FEB 4 1975 3,864,111

REDUCING STRESS BIREFRINGENCE IN FUSED SILICA OPTICAL ELEMENTS

BACKGROUND OF THE INVENTION

The chemical etching of glass surfaces is a well-known process and has been employed extensively to polish glass or to remove surface blemishes from glass articles.

SUMMARY OF THE INVENTION

The present invention employs a glass etching technique, not to enhance the mechanical properties of the glass surface, but to eliminate stressed surface layers of optical elements and in so doing reduce stress-birefringence.

The method is a simple chemical etching technique for relieving the residual stress in light-transmitting plates, or plate-like optical parts, caused by the operations of sawing, grinding, and/or polishing the plate to required shape. The principal material to which the method is applied is fused-silica glass. The primary application of the method is in the fabrication of optical elements for photo-elastic (piezo-optical) modulators, in which it is desirable to eliminate or greatly minimize the residual or "quiescent" photoelastic birefringence. Other applications include the fabrication of windows (e.g. interfacing into a vacuum or gas chamber) in any device involving polarized light, such as polarimeters and instruments for measuring circular dichroism, in which freedom from accidental birefringence in the light path is desired.

Fused-silica ($SiO_2$) glass has a singular position as an optical material because of its transparency in the ultraviolet as well as in the visible, and because of its chemical inertness and stability. It is further advantageous because of its optical isotropy (lack of inherent birefringence); and also because of its high mechanical Q (i.e., its small acoustic loss factor), which facilitates the design of resonant photoelastic devices. The method described in the present invention applies equally well to a closely similar material denoted as fused quartz.

Fused-silica glass is manufactured in the form of ingots, from which sheets or blocks are cut and made available commercially. The sheets or blocks may be further cut and ground to shape for parts such as lenses, flat windows, etc. The intrinsic or bulk strain in as-grown fused-silica ingots may be negligibly small; or individual ingots or portions of them can be selected which have minimum inherent strain. But appreciable strain is automatically introduced into the finished optical parts by the procedures of cutting, grinding, and polishing. In ordinary (silicate) glass, such working strain can be eliminated by thermal annealing. In fused-silica or fused-quartz glass, thermal annealing of finished optical parts is possible in principle but is extremely difficult in practice, because of the high melting and annealing points (1,750°C. and 1,140°C. respectively) of the material, furthermore, annealing must be done in a high vacuum or inert atmosphere to prevent discoloration. In the inventor's experience, successful annealing of fused silica parts is not feasible in ordinary industrial glass-working shops. The etching technique described here can easily be applied in such establishments.

Stress arises in cut fused-silica parts as a result of mechanical cutting. Due to microscopic mechanical and thermal effects at the sawing interface, the surface layer becomes stretched. A permanent outward deformation is thus produced across the area of the cut face. This reacts against the underlying interior region to produce a static, outward distension in the interior of the cut piece. The distensional stress in the interior in turn reacts back on the exposed surface layer to produce a static compressional stress in that layer.

The degree of resulting stress is undoubtedly influenced by the speed of sawing, the lubricant used, and by subsequent working operations (grinding, polishing). But it has been found that the basic effect cannot be avoided by any of the normal working methods employed in most industrial and research shops. In particular, grinding can remove the deformed surface layer produced by sawing, but grinding introduces further deformation due to microscopic mechanical and thermal effects similar to those which occur in sawing.

The typical thickness of the deformed layer due to sawing (e.g., with a diamond or carborundum wheel with water lubricant) is 0.001 inch – 0.004 inch. Tests show that lapping more than this thickness from the sawed surface still results in a surface deformation and thickness of the same order of magnitude, with the same degree of static stress introduced into the piece, regardless of the grit sizes of the grinding compound. Furthermore, simple polishing or buffing of the surface does not anneal the stress.

The deformed surface layer can be removed, and the stresses produced by working operations thereby removed, by etching the layer off chemically with hydrofluoric acid (HF), as described below. The method is the only simple one for this purpose which can be applied in general-purpose glass-working shops.

The present invention is a method for reducing stress-birefringence in light transmitting optical elements, comprising the etch removal of the surface layers stressed by mechanical abrasion and thermal effects in fabrication. The etch removal of stressed surface layers is employed to relieve uniaxial strain directed in the plane of the light-transmitting faces, and in so doing to reduce stress-birefringence. The mechanically or thermally stressed layers are removed by subjecting the optical element to an etchant corrosive to the optical element substrate.

In a preferred embodiment, the stressed layers of the optical element are removed by subjecting the optical element to an immersion in an aqueous hydrofluoric acid solution. The preferred strength of the solution is approximately 50 percent hydrofluoric acid. The rate, depth, and uniformity of the etching may be enhanced by conducting the etch process in a bath of hydrofluoric acid solution which is maintained at a constant temperature of approximately 25° C. and which is continuously agitated.

In a preferred embodiment, the light-transmitting surfaces of the optical element are covered with an etchant resistant material. Since stressed layers in the light-transmitting faces normally do not contribute to the stress-birefringence of the optical element, these faces need not be etched. The light-transmitting faces are therefore protected from the etchant and its potentially deleterious effects on the optical properties of the optical element.

In a preferred embodiment, the optical element is selectively covered with paraffin, which is resistant to the corrosive attack of hydorfluoric acid. The coating of the optical element is accomplished by immersing the element in liquified paraffin, then removing the element from the liquified paraffin and permitting the layer of paraffin so formed to solidify. The parrafin is then cut or scraped from the non-light-transmitting surfaces. Finally, the paraffin is beveled back from the edges of the protected faces so that the paraffin contacting the protected faces is thinnest near the edges of the protected faces.

In a preferred embodiment, the optical element substrate is subjected to the etchant for a period of time sufficient to remove the mechanically abraded or thermally effected layers of the substrate which are under static compressional stress. Typically, this layer is from about 0.001 inch to about 0.004 inch in depth and requires not more than a 3 hour immersion in a 50 percent solution of hydrofluoric acid at 25°C. for its removal.

The type of strain producing undesired birefringence is uniaxial strain directed in the plane of the light-transmitting faces. Isotropic or volume strain and also uniaxial strain directed perpendicular to the plane of the transmitting faces are of no consequence.

In parts which have been formed by contour cutting from a larger, flat plate, experience shows that the principal source of planar uniaxial stress is that which arises from cutting and grinding the contour, rather than from the previous finishing of the light-transmitting faces as in the plates. The precise reason for this circumstance is not evident, but a plausible explanation is as follows. In a semi-infinite flat plate, or in practice in a plate very broad relative to the thickness, no preferred direction exists for uniaxial stress to develop in the plane of the plate. Any surface deformation caused by finishing could only be a two-dimensionally isotropic, outward stretching in all directions. Such isotropic surface deformation may be present in ("frozen into") the original larger plates, but it is unimportant for the present purpose.

Tests showed that for plate-like parts cut from such flat plates, if the thickness of the part is of the order one-sixth to one-third of the smallest contour dimension, the uniaxial stress parallel to the plane of the plate is associated almost entirely with the working of the contour, and may be eliminated by etching only around the contour, without disturbing the previously polished, light-transmitting faces.

After such an etching, it has been found that the residual uniaxial stress in the center of such an element, for 5000-A light transmitted at normal incidence, was typically reduced to that corresponding to a birefringent retardation of about 0.0005 wave, or even less, for elements made from material which was nominally strain-free in the original ingot. The reduction can be attributed to the removal of the mechanically or thermally stressed surface layers.

An object of the present invention is the reduction of stress-birefringence in light-transmitting optical elements by the etch removal of stressed surface layers of the optical elements. The primary application of the method is in the fabrication of optical elements for photoelastic modulators, in which it is desirable to minimize residual stress-birefringence. Other applications include the use of the etching method in the fabrication of any optical elements used in connection with polarized light where freedom from accidental birefringence is desired.

Another object of the present invention is to provide a method for removing birefringence inducing surface stress in optical elements which can be easily preformed in ordinary glass-working shops. The successful employment of the method of the present invention requires only a quantity of hydrofluoric acid, a small amount of molten paraffin, and vessels for containing the aforementioned materials. Prior to the present invention, the only known means of removal of birefringence inducing stressed surface layers was by thermal annealing. In fused-silica or fused-quartz glass, thermal annealing of finished optical parts is possible in principle but difficult to achieve in ordinary glass working shops.

Another object of the present invention is to relieve the birefringence inducing stressed surface layers in optical elements caused by mechanical abrasion and thermal effects in fabrication. Mechanical and thermal stress engendered by the cutting of a segment from a larger ingot and the polishing of same can be reduced by the method of the present invention.

Another object of the present invention is to provide a method for removal of a surface layer of a precisely controlled thickness from an optical element without damaging the beneficial optical properties of the element. The time of immersion, the strength of the hydrofluoric acid solution, and the temperature of the solution is adjusted so that only a prescribed portion of the layers of the optical element under static compressional stress are removed.

These and other objects and features of the invention are apparent in the disclosure, which includes the drawings and the specifications with the foregoing and ongoing description and with the claims.

DETAILED DESCRIPTION OF THE DRAWINGS

Figure 1:
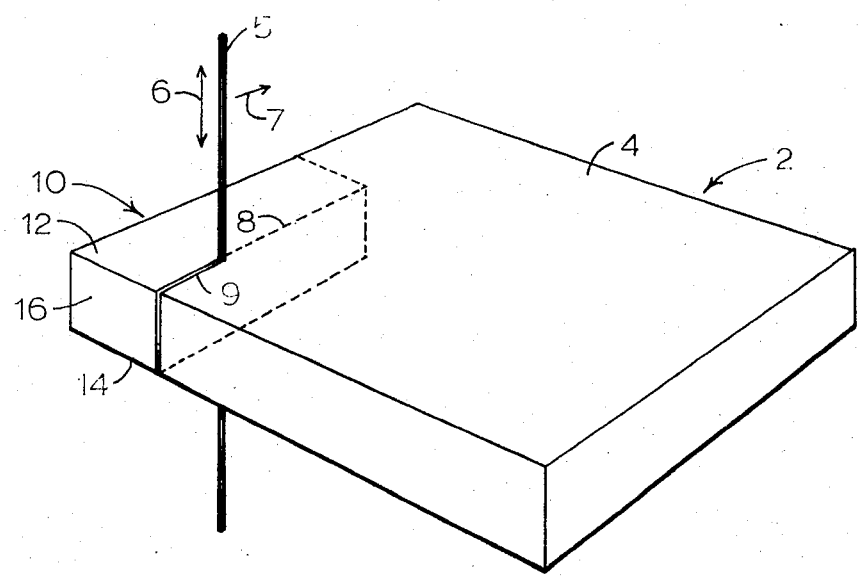
FIG. 1 is a perspective view of an ingot of material used in fabricating optical elements, showing the cutting of a smaller segment.

Referring to FIG. 1, an ingot of material used in fabricating optical elements such as an ingot of fused-silica is denoted by the numeral 2. The ingot is shown being cut into a larger segment 4 and a smaller segment 14 by a cutting means 5. The vertical translation of the cutting means and the horizontal translation of the cutting means are denoted by arrows 6 and 7, respectively. The numeral 8 denotes a plane through which the cutting means will pass, while numeral 9 denotes a plane through which the cutting means has passed.

An optical element composed of the smaller segment 14 is referred to generally by the numeral 10. A cut and ground non-optical face 16, similar to that being created in the plane through which the cutting means has passed 9, will be etched to remove stressed surface layers. In a preferred embodiment, the polished, light-transmitting face 12 will not be etched.

Figure 2:
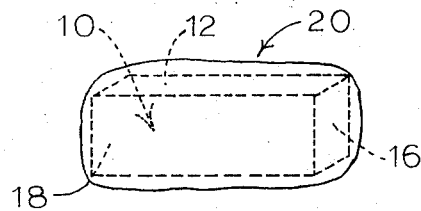
FIG. 2 is a perspective view of an optical element coated with an etchant resistant substance.

FIGS. 2, 3, 4 and 5 show a preferred embodiment involving the coating of selected faces of the optical element with an etchant resistant substance. In FIG. 2 the optical element 10 is enveloped by a coating of an etchant resistant substance. Two vertical, cut and ground, non-optical faces are denoted by the numerals 16 and 18.

Figure 3:
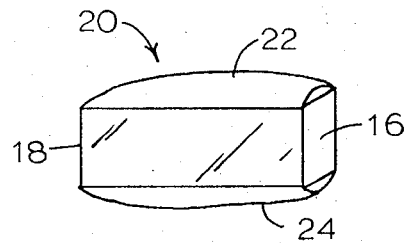
FIG. 3 is a perspective view of an optical element coated with an etchant resistant substance where several faces of the element have been stripped of their coating.
Figure 4:
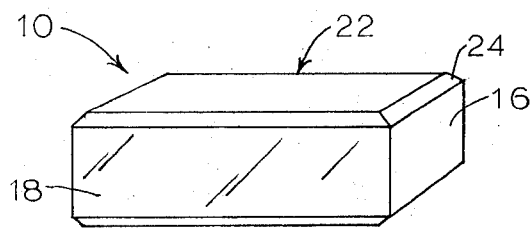
FIG. 4 is a perspective view of an optical element showing the beveled edges of the etchant resistant substance covering the upper and lower faces of the element.
Figure 5:
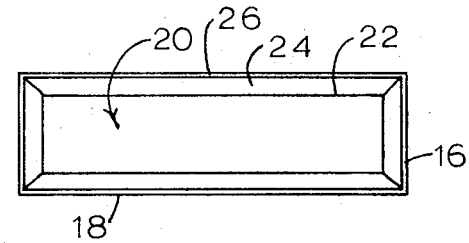
FIG. 5 is a top elevation showing a face of the optical element protected by the etchant resistant coating.

In FIG. 3 the etchant resistant substance 20 has been removed from non-optical faces 16 and 18. In FIG. 4 a beveled edge 24 has been formed in the etchant resistant substance protecting the light transmitting face. FIG. 5 is a top view of the protected face showing a narrow border of the light transmitting face 26 from which the etchant resistant substance has been removed. This border insures that the etching process will not produce protrusions at the edges between face 12 and th- vertical unprotected faces, e.g., faces 16 and 18.

Figure 6:
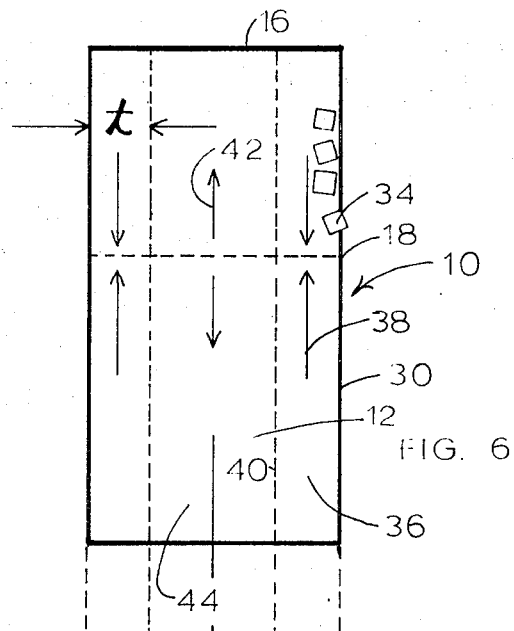
FIG. 6 is a schematic representation of the regions of stress in a mechanically abraded and thermally effected optical element.

FIG. 6 is a schematic representation of the regions of stress in the optical element. Along the mechanically abraded and thermally effected surface planes 30 lie regions of extensional edge stress due to cutting and grinding denoted schematically by numeral 34. An axis of static compressional stress 38 lies within region 36. In the interior of the segment lies a region of static outward distension 44. An axis of static outward distension 42 lies in region 44. A nodal plane dividing regions 44 and 36 is denoted by numeral 40.

Figure 7:
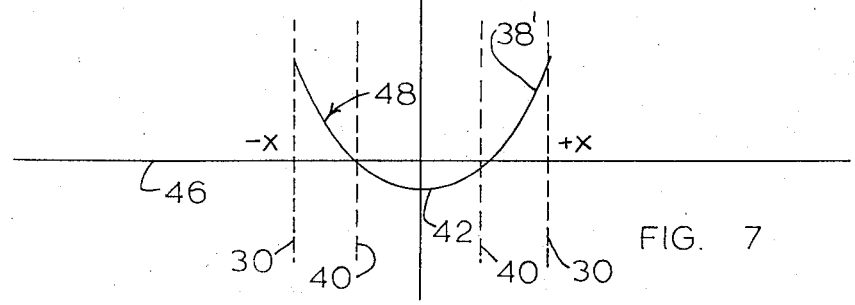
FIG. 7 is a graph showing uniaxial stress as a function of distance from the edges of the optical element schematically represented in FIG. 6.

Measurements show the distribution of longitudinal stress across the face of optical element such as shown in FIG. 6 vary as in the plot in FIG. 7. The distance denominator "$t$" in FIG. 6 is about 3 millimeters for a typical element ¼ inch thick, 2.5 inch long, and 1 inch wide. The thickness of the layer that must be removed by etching is much less than this. In a non-etched element of this type, for light transmitted through the center of the plate at normal incidence to the polished faces, the static stress is found to correspond to a birefringent retardation of typically 0.03 wave at 5,000 A.

In FIG. 7 the amount of uniaxial stress 48 is charted as a function of distance from the edges of the optical element along a horizontal axis 46 representing linear distance. The curve 48 crosses the horizontal axis 46 at the position of the nodal planes 40 where the regions of static compressional stress meet the region of static outward distension.

Figure 8:
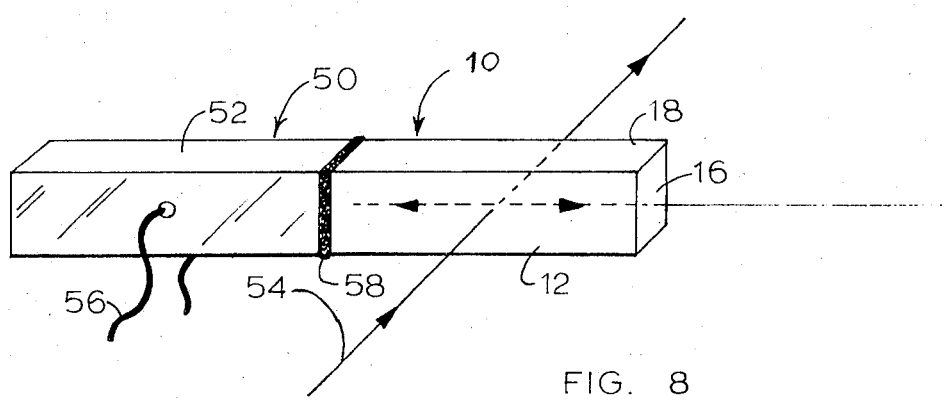
FIG. 8 is a perspective view of a typical configuration of a photoelastic modulator.

In FIG. 8 a photoelastic modulator is referred to generally by the numeral 50. The method of the present invention can be beneficially employed in the fabrication of a portion of this device. In operation the optical element 10 is made to vibrate acoustically in an extensional bar mode. by virtue of coupling to an electromechanical transducer 52, with electrical connections 56. The vibration generates an oscillating wave-plate action (birefringence) in the optical element, which is utilized to modulate the polarization state of a transmitted light beam 54. For the ideal functioning of such a device, it is critical that the plate have no photoelastic birefringence in the absence of applied stress or excitation by the transducer, i.e., the element should have no static stress of its own. Otherwise, a constant birefringence is added to the oscillating birefringence, which limits the effectiveness of the device for certain applications involving the measurement of very small percentages of polarized light. Similar considerations would apply to any windows or window-like parts used in instruments in which extreme freedom from accidental birefringence in the light path is desired.

70 takes full advantage of the stress reduction in fused-silica optical parts resulting from the etching process, no supports or other parts should be bonded to the optical element in such a way as to re-introduce stress. The silicone rubber cement bond 58 does not re-introduce stress into the optical element 10.

While the invention has been described with reference to specific embodiments, it will be obvious that modifications and variations may be constructed without departing from the spirit and scope of the invention. The scope of the invention is described in the following claims.

I claim:

1. The method of reducing stress-birefringence in fused-silica and fused-quartz light-transmitting elements by etch removal of stressed surface layers of the light-transmitting elements comprising:
    covering light-transmitting surface areas of the optical element with an etchant resistant substance,
    subjecting the selectively covered optical element to an etchant corrosive to the optical element substrate for a period of time sufficient to remove mechanically abraded or thermally effected layers of the substrate under static compressional stress (typically 0.001 inch to 0.004 inch), and
    removing by means of the etchant uniaxial strain directed in the plane of light-transmitting faces which strain gives rise to stress-birefringence.

2. The method of reducing stress-birefringence of claim 1 further comprising subjecting the selectively covered optical element to an etchant corrosive to the optical element substrate in the form of an immersing in an aqueous solution of hydrofluoric acid.

3. The method of reducing stress-birefringence of claim 2 wherein the subjecting of the optical element to hydrofluoric acid comprises immersing in an aqueous solution of approximately 50 percent hydrofluoric acid.

4. The method of reducing stress-birefringence of claim 2 wherein the subjecting of the optical element to hydrofluoric acid comprises immersing in a bath of hydrofluoric acid which is agitated during the etching operation.

5. The method of reducing stress-birefringence of claim 2 wherein the subjecting of the optical element to hydrofluoric acid comprises immersing in a bath of hydrofluoric acid which is maintained at approximately 25°C.

6. The method of reducing stress-birefringence of claim 2 wherein the covering step comprises selectively covering the substrate with paraffin.

7. The method of reducing stress birefringence of claim 1 wherein the selective covering of the light transmitting faces of the optical element is accomplished by:

immersing the optical element in a liquified, etchant resistant substance, solidifying the etchant resistant substance cutting or scraping the etchant resistant substance from the non-light-transmitting surfaces, and beveling the etchant resistant substance back from the edges demarcating the protected faces so that the etchant resistant substance contacting the protected faces is thinest near the edges demarcating the protected faces.

8. The method of reducing stress-birefringence of claim 1 wherein the removing of stressed surface layers comprises removing stressed surface layers created by mechanical cutting or polishing processes in the fabrication of the optical element.

9. The method of reducing stress-birefringence of claim 1 wherein the technique for etching optical elements described in claim 2 is employed in the fabrication of optical elements where it is desirable to minimize residual stress-birefringence such as in the fabrication of optical elements for photoelastic modulators.

10. The method of reducing stress-birefringence of claim 1 further comprising the initial step of severing the optical elements from a larger block of fused silica.

11. The method of reducing stress birefringence of claim 1 further comprising the ultimate step of joining the stress-reduced element to a electromechanical transducer.

* * * * *